US007562215B2

(12) United States Patent
Cummins

(10) Patent No.: US 7,562,215 B2
(45) Date of Patent: Jul. 14, 2009

(54) SYSTEM AND METHOD FOR ELECTRONIC DOCUMENT SECURITY

(75) Inventor: Fred A. Cummins, Farmington Hills, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 389 days.

(21) Appl. No.: 10/443,448

(22) Filed: May 21, 2003

(65) Prior Publication Data

US 2004/0237035 A1 Nov. 25, 2004

(51) Int. Cl.
*H04L 9/00* (2006.01)

(52) U.S. Cl. ...................................................... 713/165

(58) Field of Classification Search ................. 713/165, 713/175, 176; 726/27
See application file for complete search history.

(56) References Cited

U.S. PATENT DOCUMENTS

| | | | | |
|---|---|---|---|---|
| 6,088,679 | A | 7/2000 | Barkley | 705/8 |
| 6,185,684 | B1 * | 2/2001 | Pravetz et al. | 713/182 |
| 6,647,388 | B2 * | 11/2003 | Numao et al. | 707/9 |
| 6,973,445 | B2 * | 12/2005 | Tadayon et al. | 705/64 |
| 7,035,910 | B1 * | 4/2006 | Dutta et al. | 709/217 |
| 7,085,926 | B1 * | 8/2006 | Peach | 713/160 |
| 2001/0021928 | A1 * | 9/2001 | Ludwig et al. | 705/67 |
| 2002/0046352 | A1 * | 4/2002 | Ludwig | 713/201 |
| 2002/0129056 | A1 | 9/2002 | Conant et al. | 707/511 |
| 2002/0152086 | A1 | 10/2002 | Smith et al. | 705/1 |
| 2002/0178380 | A1 * | 11/2002 | Wolf et al. | 713/201 |
| 2002/0184517 | A1 * | 12/2002 | Tadayon et al. | 713/200 |
| 2003/0014503 | A1 * | 1/2003 | Legout et al. | 709/219 |
| 2003/0023623 | A1 | 1/2003 | Horvitz et al. | 707/500 |
| 2003/0154381 | A1 | 8/2003 | Ouye et al. | 713/182 |
| 2004/0103202 | A1 | 5/2004 | Hildebrand et al. | 709/229 |

FOREIGN PATENT DOCUMENTS

WO WO 2005/009003 A1 1/2005

OTHER PUBLICATIONS

Notification of Transmittal of the International Search Report and the Written Opinion of the International Searching Authority, or the Declaration, mailed Oct. 20, 2005, re PCT/US04/15989 filed May 21, 2004 (8 pages).
Articsoft, "FileAssurity—File Encryption and Digital Signature software," 2 pages.
Articsoft, "ContentAssurity—Digital Signature & Encryption software," 3 pages.
Armstrong, M.W., "An Introduction to XACML," INET, XP-002304622, SANS Institute 2003, 11 pages.
International Search Authority, PCT, "Notification of Transmittal of the International Search Report and Written Opinion of the International Searching Authority, or the Declaration," 11 pages.

* cited by examiner

*Primary Examiner*—Kambiz Zand
*Assistant Examiner*—Peter Poltorak

(57) ABSTRACT

A method for providing document-level security for electronic documents comprises identifying a plurality of roles for the electronic document, the plurality of roles comprising at least one role associated with a first participant ID of a first client. The roles are dynamically stored in the electronic document. One or more participant IDs are dynamically stored in the electronic document, including at least the first participant ID, wherein each participant ID is associated with at least one role. A second participant ID of a second client is determined and the second client's ability to access the electronic document is automatically determined based, at least in part, on the second participant ID and the stored roles and participant IDs.

19 Claims, 3 Drawing Sheets

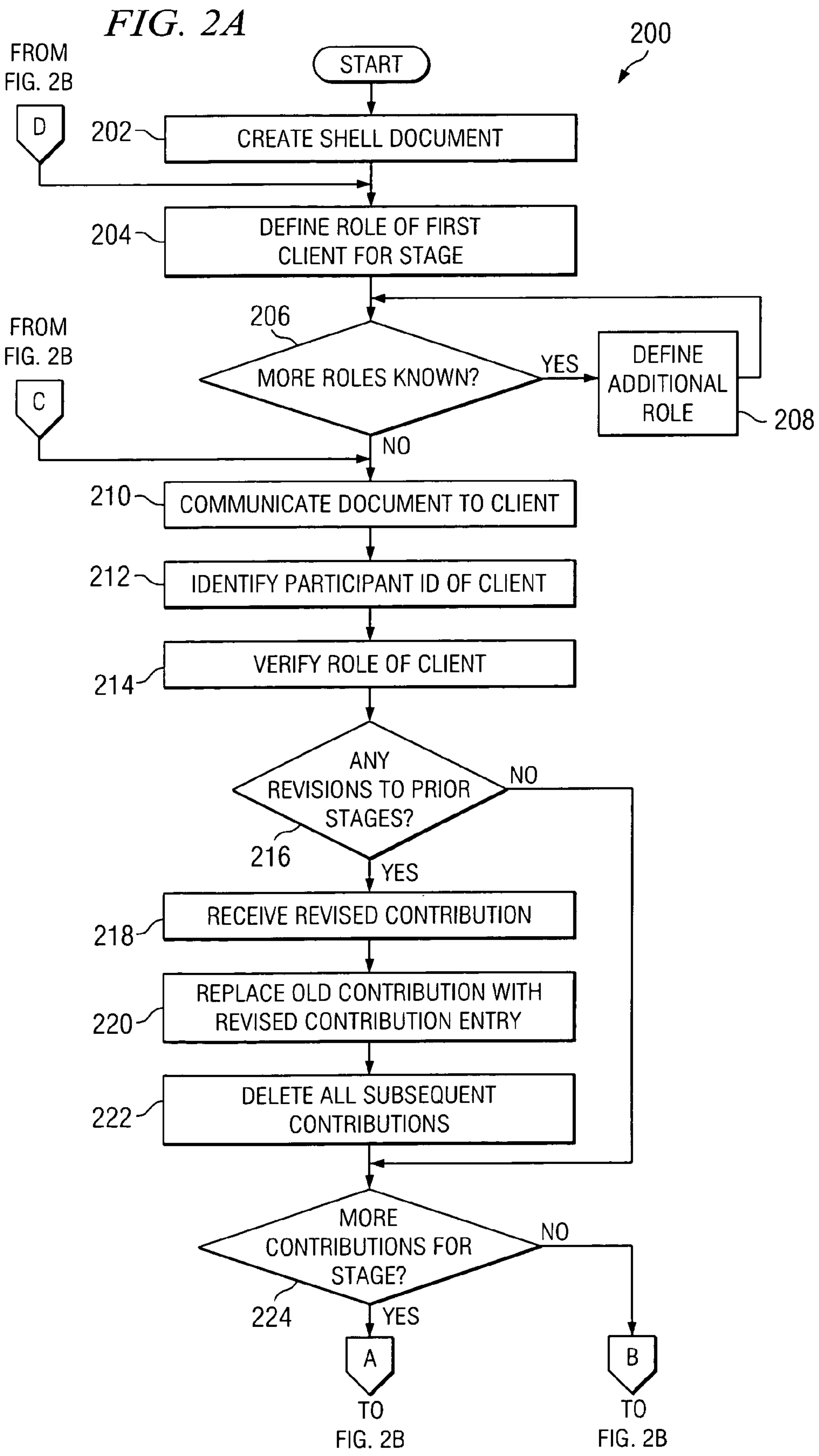
FIG. 2A
200
START
FROM FIG. 2B
D
202
CREATE SHELL DOCUMENT
204
DEFINE ROLE OF FIRST CLIENT FOR STAGE
206
MORE ROLES KNOWN?
YES
DEFINE ADDITIONAL ROLE
208
FROM FIG. 2B
C
NO
210
COMMUNICATE DOCUMENT TO CLIENT
212
IDENTIFY PARTICIPANT ID OF CLIENT
214
VERIFY ROLE OF CLIENT
ANY REVISIONS TO PRIOR STAGES?
NO
216
YES
218
RECEIVE REVISED CONTRIBUTION
220
REPLACE OLD CONTRIBUTION WITH REVISED CONTRIBUTION ENTRY
222
DELETE ALL SUBSEQUENT CONTRIBUTIONS
MORE CONTRIBUTIONS FOR STAGE?
NO
224
YES
A
TO FIG. 2B
B
TO FIG. 2B

SYSTEM AND METHOD FOR ELECTRONIC DOCUMENT SECURITY

TECHNICAL FIELD OF THE INVENTION

This invention relates generally to electronic documents and, more particularly, to a system and method for electronic document security.

BACKGROUND OF THE INVENTION

Organizations are increasingly using electronic documents as business processes become increasingly automated and business is conducted over the Internet or local networks. Electronic documents that establish obligations or responsibility often provide legal proof of knowledge, statements, and agreements through the use of electronic signatures. With electronic documents, current systems may provide application or process level security to provide accountability and access control to each portion of the electronic compound document. But these security mechanisms require that the electronic document is accessed through an application that includes the appropriate access logic which, in many cases, requires interpretation of the document structure and content.

SUMMARY OF THE INVENTION

One aspect of the invention is a method for providing document-level security for electronic documents comprises identifying a plurality of roles for the electronic document, the plurality of roles comprising at least one role associated with a first participant ID of a first client. The roles are dynamically stored in the electronic document. One or more participant IDs are dynamically stored in the electronic document, including at least the first participant ID, wherein each participant ID is associated with at least one role. A second participant ID of a second client is determined and the second client's ability to access the electronic document is automatically determined based, at least in part, on the second participant ID and the stored roles and participant IDs.

The invention has several important technical advantages. Various embodiments of the invention may have none, some, or all of these advantages. The invention allows document-specific access control or security without the use of applications designed to control access to specific types of documents. For example, the invention provides organizations with the ability to use a common document retrieval facility that determines accountability and access control from information stored in the individual electronic documents. An additional advantage is that the authority of participants may change as the document goes through different stages of development, but the final authority of participants is preserved after completion of the development process and even if the process is later changed or eliminated. Further, the invention may be incorporated into a document repository, into business applications, and web services exchanges. Other technical advantages of the present invention will be readily apparent to one skilled in the art.

BRIEF DESCRIPTION OF THE DRAWINGS

For a more complete understanding of the present invention and its advantages, reference is now made to the following descriptions, taken in conjunction with the accompanying drawings, in which:

FIGS. 2A-B illustrate a flow chart of an exemplary method for providing document-level security for an electronic document.

DETAILED DESCRIPTION OF EXAMPLE EMBODIMENTS OF THE INVENTION

Figure 1:
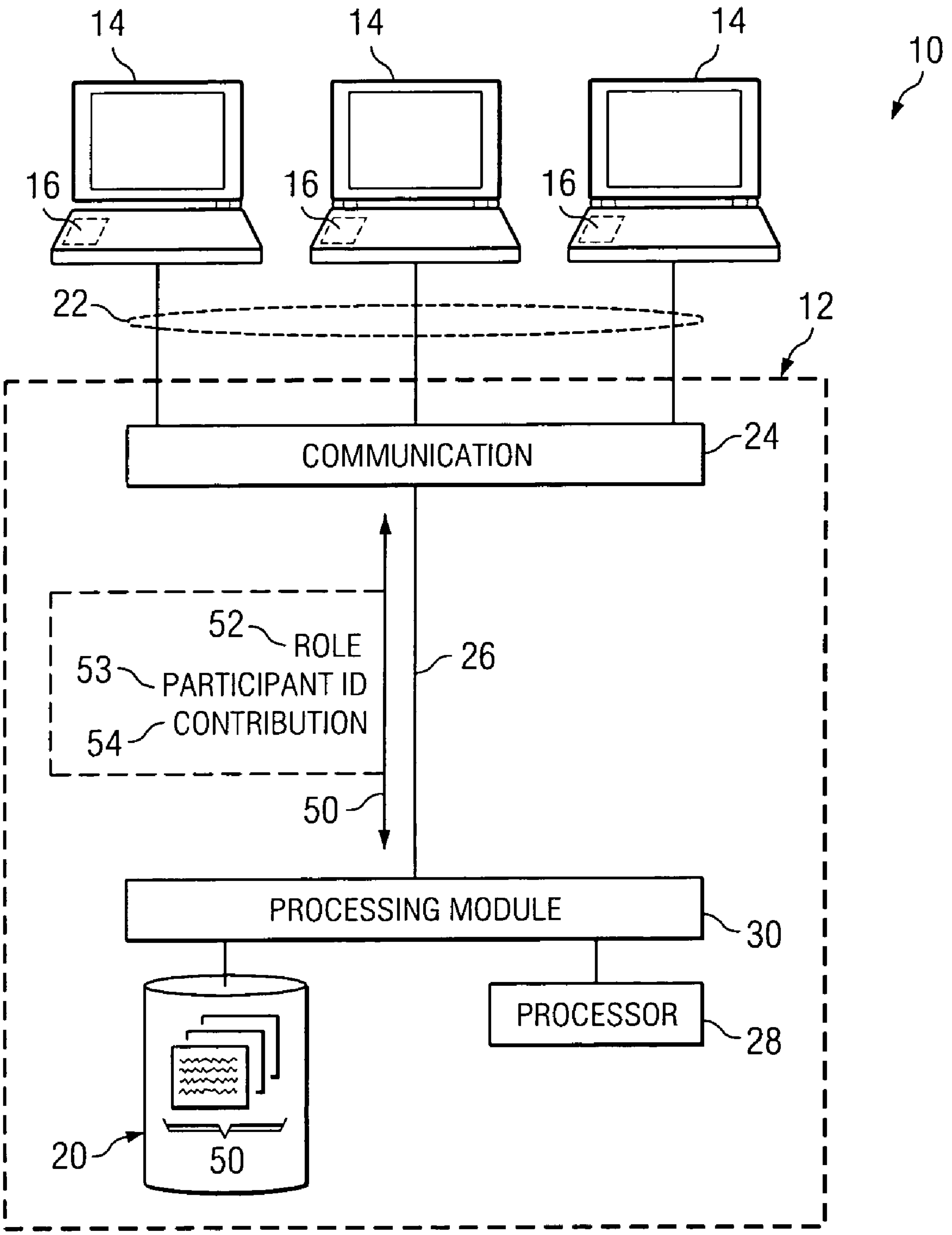
FIG. 1 illustrates one embodiment of a system for providing document-level security for electronic documents.

The preferred embodiment of the present invention and its advantages are best understood by referring to FIGS. 1 and 2 of the drawings, like numerals being used for like and corresponding parts of the various drawings.

FIG. 1 illustrates one embodiment of a system 10 for providing document-level security for creating, accessing, and revising electronic documents 50. Generally, system 10 processes and stores electronic documents 50 that include security elements such as, for example, a role 52, a participant ID 53, and a contribution 54 of each client 14 that participated in its creation. Each role 52 is an electronic element that represents a business role of a user in document creation. Each participant ID 53 uniquely identifies one user of a client 14. Each contribution 54 is a component business element, such as a component document or portion of a business document that is associated with one or more particular roles 52. These associated security elements allow any electronic document processing application to ensure that only appropriate clients 14 access certain portions of document 50 based on the document content. Further, the use of roles 52 allows one or more clients 14, each with a unique participant ID 53, to be associated with each role and, consequently, with those portions of document 50. Accordingly, the ability to provide specific authority for one client 14 to access document 50, or portions thereof, is based on the designation of the client 14 as participating (through a participant ID 53) in a particular role 52 and the authority specified for that role 52 incorporated in document 50. In this respect, system 10 provides secure electronic documents 50 independent of the applications and processes that are typically used to operate on electronic documents 50.

System 10 includes a server 12 coupled to a variety of clients 14 referred to generally in the singular as client 14 or in the plural as clients 14. Although server 12 and clients 14 are referred to in the nomenclature of a client/server environment, it should be understood that server 12 and clients 14 may be any type of computer operating in any suitable environment that may communicate using hardware and software associated with link 22. For example, server 12 may represent an internet or email server that facilitates data communications between two clients 14, each residing on a different network. Or, in the alternative, client 14 and server 12 may illustrate different modules included in the same computing device.

Server 12 creates and processes electronic documents 50 and comprises an electronic computing device operable to receive, transmit, process and store data associated with system 10. For example, server 12 may comprise a general-purpose personal computer (PC), a Macintosh, a workstation, a Unix-based computer, a server computer, or any other suitable device. Server 12 includes any number of modules and memory 20 that are processed by processor 28 to support electronic document 50 processing. Although FIG. 1 provides one example of a server that may be used with the invention, system 10 can be implemented using computers other than servers, as well as a server pool. Server 12 may include any hardware, software, firmware, or combination thereof operable to process electronic documents 50. According to one embodiment, server 12 may comprise a web server. Server 12 can accept data from client 14 via a web browser (e.g., Microsoft Internet Explorer or Netscape Navigator) and return the appropriate hypertext markup language (HTML) or extensible markup language (XML) responses through a communication interface 24.

Server 12 also includes communication interface 24 coupled to communication link 22 to support communication between client 14 and the various components of server 12. Interface 24 comprises logic encoded in software and/or hardware in a suitable combination and operable to communicate with link 22. More specifically, interface 24 may comprise software supporting one or more communications protocols associated with link 22 and communications network hardware operable to communicate signals associated with link 22.

Processor 28 executes instructions and manipulates data to perform the operations of server 12. Although FIG. 1 illustrates a single processor 28 in server 12, multiple processors 28 may be used according to particular needs, and reference to processor 28 is meant to include multiple processors 28 where applicable. In the illustrated embodiment, processor 28 processes the data stored in memory 20 via document processing module 30. Document processing module 30 may be any module that can validate client 14 based, at least in part, on role 52 of client 14. For example, document processing module 30 may be a module stored on server 12 and automatically called by a generic document processing application when client 14 attempts to access one of the documents 50 stored in memory 70. In another embodiment, document processing module 30 may comprise all or a portion of a workflow or business process management system. The term "automatically," as used herein, generally means that the appropriate processing is substantially performed by system 10. It should be understood that automatically further contemplates any suitable user interaction with system 10.

Memory 20 may include any memory or database module and may take the form of volatile or non-volatile memory including, without limitation, magnetic media, optical media, random access memory (RAM), read-only memory (ROM), removable media, or any other suitable local or remote memory component. In this embodiment, memory 20 includes stored electronic documents 50. Memory 20 may include any other data such as, for example, relational database tables or a role element table for use by document processing module 30. Although FIG. 1 illustrates memory 20 as residing internally to server 12, memory 20 may reside externally or at any other location or locations accessible by processor 28. Memory 20 may comprise an electronic document repository, a distributed database, an access control directory, or any other appropriate storage operable to store a plurality of electronic documents 50, with roles 52 and contributions 54, from clients 14.

Each client 14 may include input devices, output devices, mass storage media, processors, memory, or other appropriate components for executing generic document application 16 using server 12. As used in this document, client 14 is intended to encompass a personal computer, workstation, network computer, kiosk, wireless data port, datashow, wireless telephone, personal digital assistant (PDA), one or more processors within these or other devices, or any other suitable processing device. "Client 14" and "user of client 14" may be used interchangeably without departing from the scope of this disclosure. For example, client 14 may comprise a computer that includes an input device, such as a keypad, touch screen, mouse, or other device that can accept information, and an output device that conveys information associated with the operation of server 12 or clients 14, including digital data, visual information, or audio information. Both the input device and output device may include fixed or removable storage media such as a magnetic computer disk, CD-ROM, or other suitable media to both receive input from and provide output to users of clients 14. It will be understood that there may be any number of clients 14 coupled to server 12. Further, it will be understood that client 14 may change over time in order to represent different devices during the processing of document 50.

In general, client 14 executes generic document application 16 to create, modify, or otherwise process electronic documents 50 according to a business process. Each client 14 may execute a different document application 16. Application 16 could include any software, firmware, or combination thereof operable to process document 50 and may be written in any appropriate computer language such as, for example, C, C++, Java, Visual Basic, and others. It will be understood that while generic document application 16 is illustrated as an individual module, the features and functionality performed by these engines may be performed by grouped multi-tasked modules. According to one embodiment, each document application 16 may include a suitable version of document processing module 30. According to another embodiment, system 10 may comprise a distributed system wherein a plurality of applications 16 call external document processing module 30 at appropriate times.

Electronic document 50 comprises any document in electronic format such as, for example, an XML document, comma separated value (CSV) file, EFT record, or any other appropriate data format. Document 50 includes security elements such as roles 52 and contributions 54. It will be understood that while these security elements are generally referred to as being included in document 50, they may be distributed across system 10 (or beyond) as long as they may be referenced when document 50 is accessed. Electronic document 50 may comprise a compound document associated with multiple component documents. Document 50 may also be formed in stages by multiple clients 14 according to various business processes. At each stage in the development of document 50, a participant relies on some or all of the existing documents in creating a new portion of the compound document. Accordingly, the use of stages allows system 10 to ensure that document 50 grows in a controlled way as defined by a business process.

Compound document 50 is often assembled through the business process, which defines the business roles of the contributors and reviewers of the document. These business roles are incorporated into, or associated with, document 50 as roles 52. The incorporation of roles 52 into document 50 ensures that only clients 14 performing one of the identified business roles may create, modify, or delete certain contributions 54. Each user of client 14 is assigned a participant ID 53 that is associated with one or more of the roles 52 already stored in document 50. Roles 52 may be defined at any time during the process as long as each role 52 is defined by the time the appropriate participant ID 53 is assigned. For example, role 52 may be defined early when it is being used to define the authority of clients 14 in regard to the portion of document 50 defined up to that point and, therefore, it will become the specification for that client 14 when the participant ID 53 is actually identified. Often, the qualification of a participant ID 53 will be determined by the document creation process. This is typically built into the process so that the process selects a participant ID 53 based on its selection criteria and the qualifications of potential clients 14.

Roles 52 may be further used to occlude certain contributions 54 from one or more clients 14. Also, clients 14 may be allowed access to specific contributions 54 instead of the entire subset of contributions for the associated role 52. Based on roles 52, a client 14 may later be denied access to portions of document 50 added by that same client 14, if the role 52 of that client 14 subsequently changed. In certain embodiments, the business process may be stored in a template for use in creating a shell document 50. This allows each stage to be previously defined with one or more unassigned roles 52 and empty contribution entries 54. In another embodiment, each stage would use a template in order to be added to document 50. This allows for the process to follow different paths as where there are different actions or approvals required depending on the subject matter or external factors. In short, roles 52 help ensure that each contribution 54 is processed appropriately.

Document 50 also includes one or more contributions 54, such as component documents, portions of a document, signatures, or null entries. For example, document 50 may comprise a sales document that includes two contributions 54: an offer letter and an acceptance letter. In another example, contribution 54 may comprise a null entry indicating that client 14 acting as a particular role 52 reviewed or authorized the prior content of document 50. Each contribution 54 may be communicated to document 50 from a different client 14 performing a different role 52. Further, client 14 may be required to authorize, approve, or validate some or all of document 50 through a signature. Accordingly, each signature may comprise an electronic signature contribution 54 that verify other contributions 54. The electronic signature typically uses a hashing algorithm to derive a unique value in document 50 and provide user certification and accountability. The hash value is then encrypted with the private key of client 14 so the signature value can only be created from a document 50 identical to the present document by the same signer. For example, the XML signature specification from the World Wide Web Consortium (W3C) provides a structure in which a particular signature may be applied to one or more specified segments of document 50. It will be understood that signatures are not required but may be used to provide document authentication through client 14 certification and accountability. An example document 50 is illustrated below:

```
<RoleCredentials>
<Stage Sequence=1>
    <Role Specs>
        <Role ID="Buyer" Enterprise="Big Customer">
        <Role ID="Seller" Enterprise="ABC Manufacturing">
    </Role Specs>
    <Participant UserID="john.doe@BigCustomer.com"
    Role="#Buyer>
        <Contribution>
            <Reference Document="#QuoteRequest"/>
            <Reference Document="#Requirements"/>
            <Reference Document="#CreditInfo"/>
        </Contribution>
    </Participant>
    <Participant ID 53="#Seller">
        <OccludedContent>
            <Reference Document="#CreditInfo"/>
        </OccludedContent>
    </Participant>
</Stage>
<Stage Sequence=2>
    <Role Specs>
        <Role ID="Creditor" Enterprise="Big Bank">
    </Role Specs>
    <Participant UserID="jack.jones@ABCManufacturing.com"
    Role="#Seller>
        <Contribution>
            <Reference Document="#Offer"/>
            <Reference Document="#DetailSpec"/>
        </Contribution>
```

-continued

```
    </Participant>
    <Participant ID 53="#Creditor">
        <OccludedContent>
            <Reference Document="#DetailSpec"/>
        </OccludedContent>
    </Participant>
    <Participant ID 53="#Buyer">
        <OccludedContent>
            <Reference Document="#DetailSpec"/>
        </OccludedContent>
    </Participant>
</Stage>
<Stage Sequence=3>
    <Participant UserID="jane.smith@BigBank.com"
    Role="#Creditor">
        <Contribution>
            <Reference Document="#Credit Authorization"/>
        </Contribution>
    </Participant>
</Stage>
</RoleCredentials>
```

In lay terms, the foregoing exemplary electronic document 50 illustrates an electronic representation of a sales business process with three stages: "1" (quote request), "2" (offer), and "3" (authorization). It will be understood that the above exemplary document is for example purposes only and document 50 may include any number of stages, roles 52, and contributions 54 as appropriate.

In one aspect of operation, the stages of the creation of document 50 are controlled by document processing module 30 and participant IDs 53 are assigned to roles 52 based on qualifications defined in the business process specification. Thus the participant IDs 53, roles 52, and the contributions 54 are controlled by document processing module 30. Once the known roles 52 are defined, module 30 will associate a participant ID 53 with one or more appropriate roles 52. The specifications of role 52 in document 50 will define what the related participant IDs 53 can access, but roles 52 also associate the participant ID 53 with a business role for subsequent steps in the document creation process.

In another aspect of operation, first client 14 creates a shell electronic document 50. First client 14 normally is associated with a first participant ID 53. After the shell document 50 is created, the known roles 52 and participant IDs 53 are identified and stored in document 50. Using the example document 50 above, the first stage includes two defined roles 52, "Buyer" and "Seller". Once the known roles 52 are defined, participants are assigned to various roles through the use of participant IDs 53. Then, contributions 54 may be added to document 50 based on the various roles 52 and participant IDs 53. Returning to the example, in Stage "1", first client 14 (with participant ID 53 of "john.doe@BigCustomer.com") is identified as "Buyer" for role 52. In one embodiment, once first client 14 attempts to access document 50, document processing module 30 verifies that the participant ID 53 is associated with a defined role 52. For example, document processing module 30 may compare this participant ID 53 to participant IDs 53 and roles 52 previously stored in document. In another embodiment, first client 14 may create document 50 and store the known participant IDs 53 and roles 52.

Once identified, example first client 14 communicates three contributions 54 for storage in document 50: "#QuoteRequest", "#Requirements", and "#CreditInfo". At any point after contribution 54 is added to document 50, any client 14 associated with the appropriate role 52, as defined in the document, may attach an electronic signature to approve its contents. Document 50 may also receive an occluded contribution 54 that bars one role 52 from accessing a related contribution 54. Returning once again to the example document 50, component document "#CreditInfo" may not be accessed by any client 14 that is associated with role 52 of "Seller". In Stage "2", second client 14 (with participant ID 53 of jack.jones@ABCManufacturing.com) is identified as "Seller" for role 52. As described above, this identification may be by first client 14 or document processing module 30. Essentially, this disallows second client 14 from viewing the occluded contribution 54 "#Credit Info". It will be understood that any other participant ID 53 associated with "Seller" will not be allowed to access this contribution 54 either; but any client 14 identified as "Buyer" or "Creditor" may view this contribution 54. After all contributions 54 are added to the current stage of document 50, then processing of the next stage proceeds. As document 50 is created, each client 14 involved in its creation may communicate document 50 to server 12 for storage or to another client 14 for subsequent contributions 54 or review.

Once document 50 is created, it may be stored in a generic repository on server 12, such as memory 20, for verified access by clients 14. When document 50 is requested from the generic repository, document processing module 30 may first determine if client 14 has the general authority to access the document. General document access authority includes authority whereby clients 14 with appropriate authority can access any document 50 of specified types. If client 14 does not have the general authority, document processing module 30 determines if client 14 was associated with one or more roles 52 defined in document 50, whereby the specific access authority is defined by the appropriate role 52.

Figure 2B:
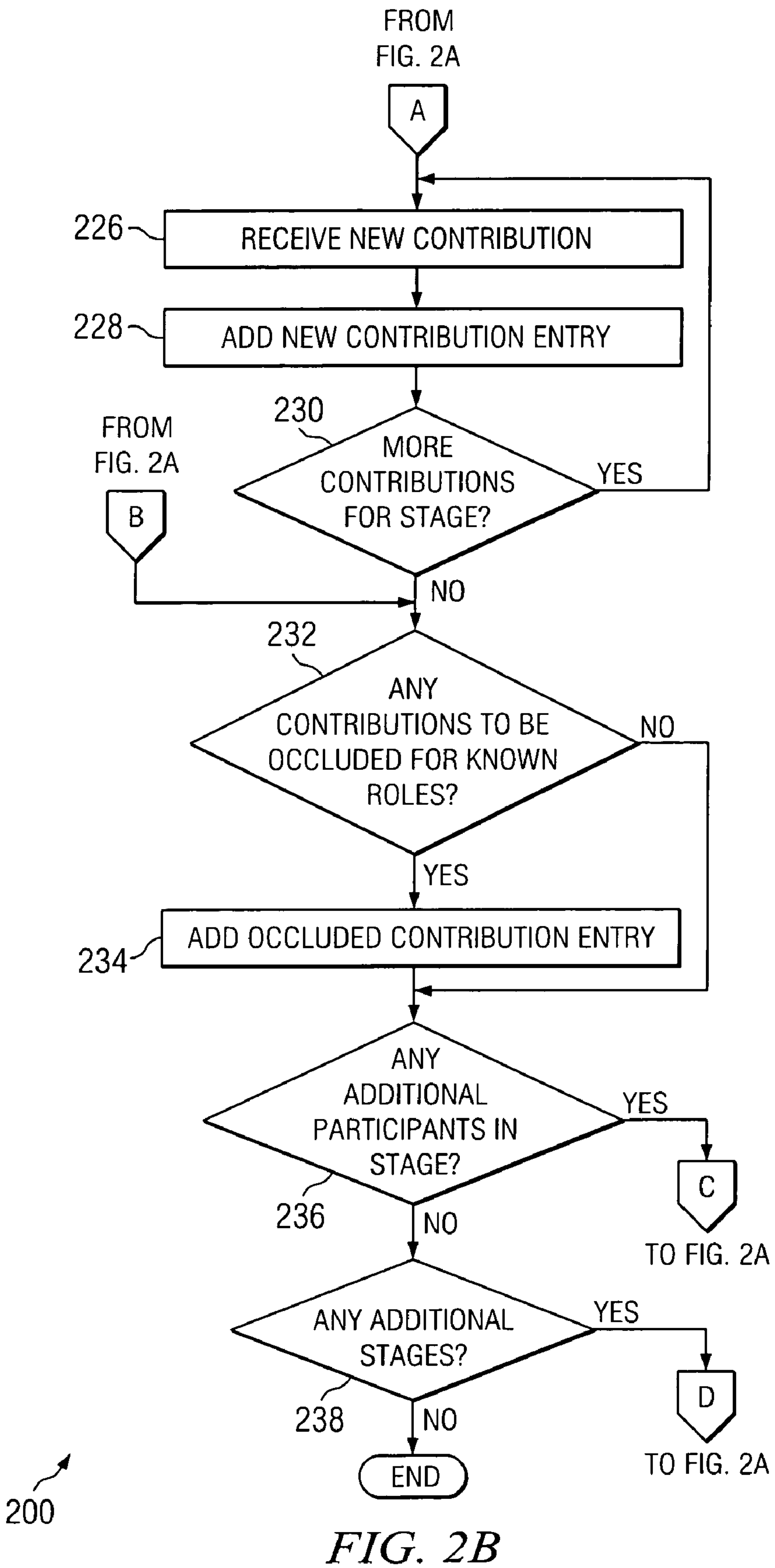

FIGS. 2A-B illustrate a flow chart of an exemplary method 200 for providing document-level security for electronic documents 50. Method 200 is described in respect to system 10. However, any other suitable system may use method 200 to provide document-level security for electronic documents 50 without departing from the scope of this disclosure. Generally, method 200 describes the creation of an electronic document 50 according to an appropriate business process and the incorporation of security elements into document 50.

First client 14 creates a shell electronic document 50 at step 202. As described earlier, first client 14 may create electronic document 50 using generic document application 16. According to certain embodiments, client 14 may create shell document 50 based upon a business process document template. Part of the document creation may include defining one or more stages for document 50. These stages often track a business process associated with document 50. In one embodiment, document 50 may comprise a compound document, which includes a plurality of component documents. For example, compound document 50 may comprise a first stage with one or more component documents. Example compound document 50 may also comprise a second stage with further component documents. According to another embodiment, each stage may relate to a particular section or signature that is added to document 50 according to the business process. Once the shell of document 50 has been created, document processing module 30 identifies a first role 52 of first client 14 for the first stage at step 204. This role is dynamically stored in electronic document 50. At decisional step 206, document processing module 30 determines if there are more roles that are known at this stage in document 50 creation. As described above, this may include first client 14 communicating one or more known roles 52 to server 12. If document processing module 30 does identify more roles, then at step 208 document processing module 30 defines and stores additional roles 52 in document 50. These stored roles 52 are used in later processing to verify the ability for clients 14 to access document 50 or to predefine the authority of participants assigned to those roles.

Once all the known roles 52 have been identified and defined for document 50, document processing module 30 communicates document 50 to the appropriate client 14 at step 210. To grant client 14 access to document 50, document processing module 30 may identify, if not already identified, the participant ID of client 14 and, possibly, stores participant ID 53 in document 50 in step 212. In a general sense, document processing module 30 verifies role 52 of client 14 attempting to access document 50 at step 214 based on the identified participant ID 53. According to particular embodiments, document processing module 30 may compare the participant ID 53 of client 14 to the defined roles 52 or participant IDs 53 in document 50. This dynamic verification of roles 52 allows the security to be document-specific. At decisional step 216, if client 14 has revisions to any contributions 54 made by any client 14 associated with the same role 52, then at step 218 server 12 receives the revised contribution 54 from client 14. Server 12 replaces the old contribution 54 with the revised contribution 54 entry at step 220. Then, at step 222, server 12 deletes or invalidates some or all subsequent contributions 54 that were previously stored or referenced in document 50. Often, only subsequent contributions 54 that include content, whether a component document or a signature, based in part on the revised contribution 54 are deleted or invalidated. This helps ensure that document consistency is maintained.

Once client 14 has revised contribution 54 in the prior stage, there are no remaining valid subsequent contributions 54. If client 14 has more contributions 54 (some may have just been invalidated) in this stage at decisional step 224, then execution proceeds to step 226. At step 226, server 12 receives a new contribution 54 entry from client 14. As described above, this contribution 54 may comprise a portion of an electronic document 50 or a component document of the compound electronic document 50. Once the new contribution 54 is received, server 12 adds the new contribution 54 entry to electronic document 50 at step 228. New contribution 54 entry may comprise a symbolic link to the physical file or adding the contribution 54 as a physical component of document 50. As server 12 adds the new contribution 54, server 12 may, alternatively or in combination, receive an electronic signature that can be used to ensure that unauthorized changes are not made to this contribution 54 and that client 14 may be held accountable in its formation of document 50. At decisional step 230, server 12 determines if there are more contributions 54 in this stage. If there are additional contributions 54, then execution returns to step 226. Otherwise, processing proceeds to steps 232 through 238 to complete processing of the stage.

If it is determined that any of the added contributions 54 are to be occluded for defined roles at decisional step 232, then server 12 adds an occluded contribution 54 entry at step 234. Otherwise processing proceeds to step 236, where it is determined if there are any additional participant IDs 53 in this stage. If there are any additional participants in this stage at decisional step 236, then processing returns to step 212 where role 52 is verified for that participating client 14. Once there are no more known roles 52 or contributions 54, this stage is complete and execution proceeds to decisional step 238. At decisional step 238, server 12 determines if there are further stages remaining in document 50. If there are no more additional stages, then execution ends. Otherwise, execution returns to step 204 where the next stage is appropriately processed. This combination of operations will, in many circumstances, result in document 50 including the appropriate security to ensure document accountability and access control regardless of the application used.

The preceding flowchart and accompanying description illustrate only an exemplary method 200 for server 12 to provide document-level security for electronic documents 50. However, system 10 contemplates server 12 using any suitable technique for performing these tasks. Thus, many of the steps in this flowchart may take place simultaneously and/or in different orders than as shown. Moreover, server 12 may use methods with additional steps, fewer steps, and/or different steps, so long as the methods remain appropriate.

Although the present invention has been described in detail, it should be understood that various changes, substitutions and alterations can be made hereto without departing from the sphere and scope of the invention as defined by the appended claims.

To aid the Patent Office, and any readers of any patent issued on this application in interpreting the claims appended hereto, applicants wish to note that they do not intend any of the appended claims to invoke 6 of 35 U.S.C. § 112 as it exists on the date of filing hereof unless "means for" or "step for" are used in the particular claim.

What is claimed is:

1. A method for providing document-level security for electronic documents, comprising:

identifying a plurality of roles for an electronic document, the plurality of roles comprising at least one role associated with a first participant ID of a first client, the electronic document comprising a compound document, the compound document comprising at least a first stage and a second stage, each stage comprising at least one contribution, the at least one contribution for at least one stage comprising a component document of the compound document, the first and second stages tracking a business process associated with the electronic document;

storing the roles in the electronic document;

associating a first subset of the plurality of roles with the first stage;

associating a second subset of the plurality of roles with the second stage;

storing one or more participant IDs in the electronic document, including at least the first participant ID, wherein each participant ID is associated with at least one role;

determining a second participant ID of a second client, the first subset of the plurality of roles comprising the first and second participant IDs;

determining the second client's ability to access the electronic document based, at least in part, on the second participant ID and the stored roles and participant IDs;

receiving a first contribution for the first stage, the first contribution provided by the first client; and receiving a second contribution for the first stage, the second contribution provided by the second client.

2. The method of claim 1, the electronic document comprising an XML document.

3. The method of claim 1, wherein determining the second client's ability to access the electronic document comprises:

comparing the second participant ID to the participant IDs stored in the electronic document; and in response to one of the participant IDs and the second participant ID being identical, allowing the second client to access the electronic document.

4. The method of claim 1, further comprising occluding the first contribution from the second client based, at least in part, on the second participant.

5. The method of claim 1, further comprising:

modifying the first contribution; and automatically invalidating the second contribution, wherein content of the second contribution is based in part on the first contribution.

6. The method of claim 1, further comprising associating an electronic signature with the first contribution, the electronic signature identifying a unique client associated with a role identical to the first role of the first participant ID.

7. The method of claim 1, wherein the second subset of roles comprises the second participant ID and the method further comprises:

receiving a request to access the electronic document from the first client; and denying the first client access to the second stage based, at least in part, on the first participant ID.

8. The method of claim 1, further comprising communicating the electronic document to the second client prior to determining the second participant ID.

9. The method of claim 1, further comprising storing the electronic document in an electronic document repository.

10. Software for providing document-level security for electronic documents, the software stored on a computer-readable medium and when executed operable to:

identify a plurality of roles for an electronic document, the plurality of roles comprising at least one role associated with a first participant ID of a first client, the electronic document comprising a compound document, the compound document comprising at least a first stage and a second stage, each stage comprising at least one contribution, the at least one contribution for at least one stage comprising a component document of the compound document, the first and second stages tracking a business process associated with the electronic document;

store the roles in the electronic document; associate a first subset of the plurality of roles with the first stage; associate a second subset of the plurality of roles with the second stage;

store one or more participant IDs in the electronic document, including at least the first participant ID, wherein each participant ID is associated with at least one role;

determine a second participant ID of a second client, the first subset of the plurality of roles comprising the first and second participant IDs;

determine the second client's ability to access the electronic document based, at least in part, on the second participant ID and the stored roles and participant IDs;

receive a first contribution to the first stage, the first contribution provided by the first client; and receive a second contribution to the first stage, the second contribution provided by the second client.

11. The software of claim 10, the electronic document comprising an XML document.

12. The software of claim 10, wherein the software operable to automatically determine the second client's ability to access the electronic document comprises the software operable to:

compare the second participant ID to the participant IDs stored in the electronic document; and in response to one of the participant IDs and the second participant ID being identical, allow the second client to access at least a portion of the electronic document.

13. The software of claim 10, further operable to occlude the first contribution from the second client based, at least in part, on the second participant ID.

14. The software of claim 10, further operable to: modify the first contribution; and automatically invalidate the second contribution.

15. The software of claim 10, further operable to associate an electronic signature with the first contribution, the electronic signature identifying a unique client associated with a participant ID identical to the first participant ID.

16. The software of claim 10, wherein the second subset of roles comprises the second participant ID and the software is further operable to:

receive a request to access the electronic document from the first client; and deny the first client access to the second stage based, at least in part, on the first participant ID and the associated roles.

17. The software of claim 10, further operable to communicate the electronic document to the second client prior to determining the second participant ID.

18. The software of claim 10, further operable to store the electronic document in an electronic document repository.

19. A system for providing document-level security for electronic documents comprising:

at least one memory operable to store a plurality of electronic documents, each electronic document including at least one stored role, a particular electronic document including a plurality of stored roles and comprising a compound document, the plurality of roles comprising at least one role associated with a first participant ID of a first client, the compound document comprising at least a first stage and a second stage, each stage comprising at least one contribution, the at least one contribution for at least one stage comprising a component document of the compound document, the first and second stages tracking a business process associated with the particular electronic document, a first subset of the plurality of roles being associated with the first stage and a second subset of the plurality of roles being associated with the second stage; and one or more processors, in response to receiving a request to access one of the electronic documents from a requesting client, collectively operable to:

determine a second participant ID of the requesting client, the first subset of the plurality of stored roles comprising the first and second participant IDs;

automatically determine the requesting client's ability to access the electronic document based, at least in part, on the second participant ID of the requesting client and the stored roles;

receive a first contribution to the first stage, the first contribution provided by the first client; and receive a second contribution to the first stage, the second contribution provided by the requesting client.

* * * * *